United States Patent
Kim et al.

(10) Patent No.: US 12,142,920 B2
(45) Date of Patent: Nov. 12, 2024

(54) OUTPUT DISTRIBUTION METHOD OF POWER SUPPLY SYSTEM

(71) Applicant: HYOSUNG HEAVY INDUSTRIES CORPORATION, Seoul (KR)

(72) Inventors: Jeong Joong Kim, Suwon-si (KR); Jong Hyung Park, Uiwang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 299 days.

(21) Appl. No.: 17/623,143

(22) PCT Filed: May 11, 2021

(86) PCT No.: PCT/KR2021/005852
§ 371 (c)(1),
(2) Date: Dec. 27, 2021

(87) PCT Pub. No.: WO2021/230607
PCT Pub. Date: Nov. 18, 2021

(65) Prior Publication Data
US 2022/0239102 A1     Jul. 28, 2022

(30) Foreign Application Priority Data
May 14, 2020 (KR) .................. 10-2020-0057752

(51) Int. Cl.
*H02J 3/14* (2006.01)
*H02J 3/46* (2006.01)
(52) U.S. Cl.
CPC ............. *H02J 3/144* (2020.01); *H02J 3/46* (2013.01); *H02J 2203/10* (2020.01)
(58) Field of Classification Search
CPC .......... H02J 3/144; H02J 3/46; H02J 2203/10; Y02B 70/3225; Y04S 20/222
See application file for complete search history.

(56) References Cited

U.S. PATENT DOCUMENTS

| | | |
|---|---|---|
| 2015/0145336 A1 | 5/2015 | Paquin et al. |
| 2016/0013670 A1 | 1/2016 | Tohara et al. |
| 2019/0334346 A1 | 10/2019 | Kawai et al. |

FOREIGN PATENT DOCUMENTS

| | | |
|---|---|---|
| JP | 2017-184390 A | 10/2017 |
| JP | 2020-072637 A | 5/2020 |

(Continued)

OTHER PUBLICATIONS

Office Action as to European Patent Application No. 21803821.4 (PCT/KR2021005852), European Patent Office, Jun. 3, 2024.

*Primary Examiner* — Charles R Kasenge
(74) *Attorney, Agent, or Firm* — NKL Law; Jae Youn Kim

(57) ABSTRACT

An output distribution method of a power supply system includes: if a required output power of a power supply system exceeds a reference value, assigning the required output power equally to all PCSs; if the required output power does not exceed the reference value, assigning at least one maximum power driving PCS to be operated with a maximum driving ratio power, on the basis of a maximum driving ratio and a lowest driving ratio; if a remaining power unassigned during power assignment of the maximum power driving PCS exceeds a lowest driving ratio power, assigning a remaining power driving PCS for operation of the remaining power; and if the remaining power unassigned during the power assignment of the maximum power driving PCS does not exceed the lowest driving ratio power, equally dividing and reassigning the required output power to the maximum power driving PCS.

14 Claims, 7 Drawing Sheets

(56) References Cited

FOREIGN PATENT DOCUMENTS

| KR | 10-2012-0136114 A | 12/2012 |
|----|-------------------|---------|
| KR | 10-2017-0057648 A | 5/2017  |
| KR | 10-2018-0066766 A | 6/2018  |
| KR | 10-2019-0093034 A | 8/2019  |
| KR | 10-2019-0107794 A | 9/2019  |
| KR | 10-2019-0143341 A | 12/2019 |

OUTPUT DISTRIBUTION METHOD OF POWER SUPPLY SYSTEM

TECHNICAL FIELD

The present invention relates to a power distribution method of a power supplying system, and more particularly, to a method of distributing power at optimal efficiency in a power supplying system including a plurality of power conditioning systems (PCSs) or a plurality of power electronics building blocks (PEBBs; hereinafter, referred to as "PEBBs"). That is, the present invention relates to a method of controlling an operation of a plurality of PCSs or a plurality of PEBBs in a power supplying system according to an operating environment.

BACKGROUND ART

In order to construct a smart power grid through efficient power management of power facilities, industrial facilities, and private facilities, smart grid technology, in which information technology (IT) is applied to an existing power grid, is emerging.

In a smart grid environment, a hybrid network, in which various devices are mixed and wired and wireless networks are combined, is constructed. For example, in a smart grid communication network construction method, broadband wireless communication (WiMAX) is used for a trunk network, and high-speed power line communication (PLC) is used for a subscriber network, thereby increasing efficiencies of Internet/telephone services as well as construction of smart grids of electric power companies (for integrated meter reading, energy management, electric vehicles, solar power facility monitoring, and the like).

As an example, in Korean Patent Publication No. 10-2012-0097551, a method of turning a specific device on/off is used in order to save power in a smart grid system. However, the existing smart grid system does not present an appropriate method of distributing energy in order to efficiently use supplied energy.

Meanwhile, photovoltaic systems (hereinafter, referred to as "PV systems") are systems in which solar cell panels are provided on an upper surface of a flat or curved plate to convert solar energy into electricity. Such a PV system is operated in an area with high efficiency at the time of maximum output but is operated in an area with low efficiency in a low power generation state, resulting in loss of a power generation amount.

Energy storage systems (ESSs) can perform a core function of converting now actively developed new and renewable energy sources into high-quality power and then applying the high-quality power to a smart grid. In particular, the ESS is a device necessary for linking a wind power generation system and a PV system with high output fluctuations to a grid.

A principle of storing energy is that electric energy is received from a power grid, the received electric energy is stored as ionized, kinetic, physically compressional, and chemical energy, the stored energy is converted into electric energy when necessary, and the converted electric energy is supplied to the power grid. Medium-to-large ESSs may be classified into various types, and in a lithium ion battery which is a representative secondary battery, a separation membrane and an electrolyte are provided between a positive electrode and a negative electrode, and thus, lithium ions store or discharge energy while moving.

however, the lithium ion battery is less economical, but due to good output characteristics and high efficiency, the lithium ion battery has recently been widely applied. In particular, a method of constituting a power supplying system by providing a plurality of unit power conditioning systems (PCSs) including a battery pack composed of lithium ion batteries for one destination site is widely used.

However, in this case, without considering the plant characteristics and operating environment of a site in which a power supplying system is positioned, the power supplying system is operated in such a manner that outputs are simply distributed to individual PCSs according to the output efficiency of the individual PCSs or the efficiency according to a current charging amount, thereby resulting in a decrease in overall system efficiency.

DISCLOSURE

Technical Problem

The present invention is directed to providing an output distribution method of a power supplying system, which is capable of improving overall system efficiency by operating a power supplying system according to the plant characteristics and operating environment of a site in which the power supplying system is positioned.

The present invention is also directed to providing an output distribution method of a power supplying system, which is capable of increasing a lifetime of a power conditioning system (PCS) by operating a power supplying system according to the plant characteristics and operating environment of a site in which the power supplying system is positioned.

Technical Solution

According to one embodiment of the present invention, an output distribution method of a power supplying system, which includes a plurality of power conditioning systems (PCSs), includes a required output power comparing operation of comparing required output power of a power supplying system with a reference value, a unit operation PCS power allocating operation of, when the required output power exceeds the reference value, equally allocating the required output power to all PCSs and operating the PCSs in a first mode, a maximum power-operated PCS power allocating operation of, when the required output power does not exceed the reference value, assigning one or more maximum power-operated PCSs to be operated with maximum operation ratio power based on a maximum operation ratio and a minimum operation ratio, a residual power-operated PCS power allocating operation of, when residual power, which is not allocated in the maximum power-operated PCS power allocating operation, exceeds minimum operation ratio power, assigning a residual power-operated PCS to be operated with the residual power and operating the residual power-operated PCS in a second mode together with the one or more maximum power-operated PCSs, and a maximum power-operated PCS power reallocating operation of, when the residual power, which is not allocated in the maximum power-operated PCS power allocating operation, does not exceed the minimum operation ratio power, equally dividing and reallocating the required output power to the maximum power-operated PCSs assigned in the maximum power-operated PCS power allocating operation and operating the maximum power-operated PCSs in a third mode.

The reference value may be maximum power of the power supplying system×the maximum operation ratio.

The maximum operation ratio power may be available maximum power per PCS×the maximum operation ratio.

The minimum operation ratio power may be available maximum power per PCS×the minimum operation ratio.

The maximum operation ratio and the minimum operation ratio may be set based on a predicted power generation value of the power supplying system, a power market trend, and a reference set value.

When the requested output power is greater than or equal to an upper limit reference value, the first mode may be used, when the requested output power is less than or equal to the upper limit reference value and greater than or equal to a lower limit reference value, any one of the first mode and the second mode may be used, and when the requested output power is less than or equal to the lower limit reference value, any one of the second mode and the third mode may be used.

The upper limit reference value and the lower limit reference value may be set based on a predicted power generation value of the power supplying system, a power market trend, and a reference set value.

When an operation mode is determined according to the upper limit reference value and the lower limit reference value, the maximum operation ratio and the minimum operation ratio may be determined according to the operation mode.

According to another embodiment of the present invention, an output distribution method of a power supplying system, which includes a PCS including a plurality of power electronics building blocks (PEBBs), includes a required output power comparing operation of comparing required output power of a PCS with a reference value, a unit operation PEBB power allocating operation of, when the required output power exceeds the reference value, equally allocating the required output power to all PEBBs and operating the PEBBs in a first mode, a maximum power-operated PEBB power allocating operation of, when the required output power does not exceed the reference value, assigning one or more maximum power-operated PEBBs to be operated with maximum operation ratio power based on a maximum operation ratio and a minimum operation ratio, a residual power-operated PEBB power allocating operation of, when residual power, which is not allocated in the maximum power-operated PEBB power allocating operation, exceeds minimum operation ratio power, assigning a residual power-operated PEBB to be operated with the residual power and operating the residual power-operated PCS in a second mode together with the one or more maximum power-operated PEBBs, and a maximum power-operated PEBB power reallocating operation of, when the residual power, which is not allocated in the maximum power-operated PEBB power allocating operation, does not exceed the minimum operation ratio power, equally dividing and reallocating the required output power to the maximum power-operated PEBBs assigned in the maximum power-operated PEBB power allocating operation and operating the maximum power-operated PEBBs in a third mode.

The reference value may be maximum power of the PCS×the maximum operation ratio.

The maximum operation ratio power may be available maximum power per PEBB×the maximum operation ratio.

The minimum operation ratio power may be available maximum power per PEBB×the minimum operation ratio.

The maximum operation ratio and the minimum operation ratio may be set based on a predicted power generation value of the PCS, a power market trend, and a reference set value.

When the requested output power is greater than or equal to an upper limit reference value, the first mode maybe used, when the requested output power is less than or equal to the upper limit reference value and greater than or equal to a lower limit reference value, any one of the first mode and the second mode may be used, and when the requested output power is less than or equal to the lower limit reference value, any one of the second mode and the third mode may be used.

The upper limit reference value and the lower limit reference value may be set based on a predicted power generation value of the PCS, a power market trend, and a reference set value.

When an operation mode is determined according to the upper limit reference value and the lower limit reference value, the maximum operation ratio and the minimum operation ratio may be determined according to the operation mode.

Advantageous Effects

In an output distribution method of a power supplying system according to the present invention, a power supplying system is operated according to the plant characteristics and operating environment of a site in which the power supplying system is positioned, thereby improving overall system efficiency.

In addition, in an output distribution method of a power supplying system, a power supplying system is operated according to the plant characteristics and operating environment of a site in which the power supplying system is positioned, thereby increasing a lifetime of a power conditioning system (PCS).

MODES OF THE INVENTION

Figure 1:
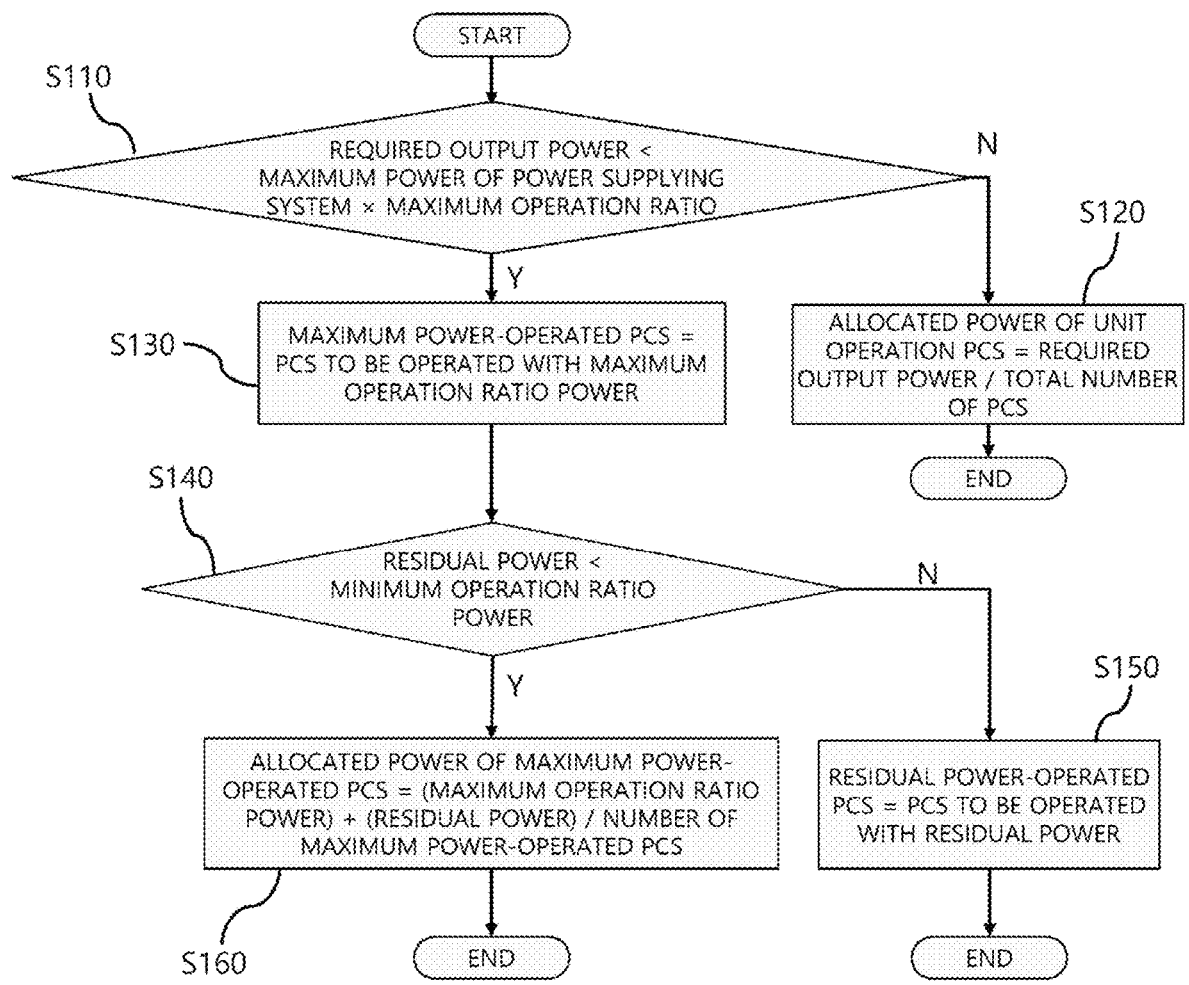
FIG. 1 is a flowchart illustrating an output distribution method of a power supplying system according to one embodiment of the present invention.

Detailed embodiments for implementing the present invention will be described with reference to the accompanying drawings.

The present invention may be modified in various ways and implemented as various embodiments so that specific embodiments are illustrated in the drawings and will be described in detail below. However, it is to be understood that the present invention is not limited to the specific embodiments but includes all modifications, equivalents, and substitutions included in the spirit and the scope of the present invention.

Hereinafter, an output distribution method and apparatus of a power supplying system according to the present invention will be described in detail with reference to the accompanying drawings.

Figure 6:
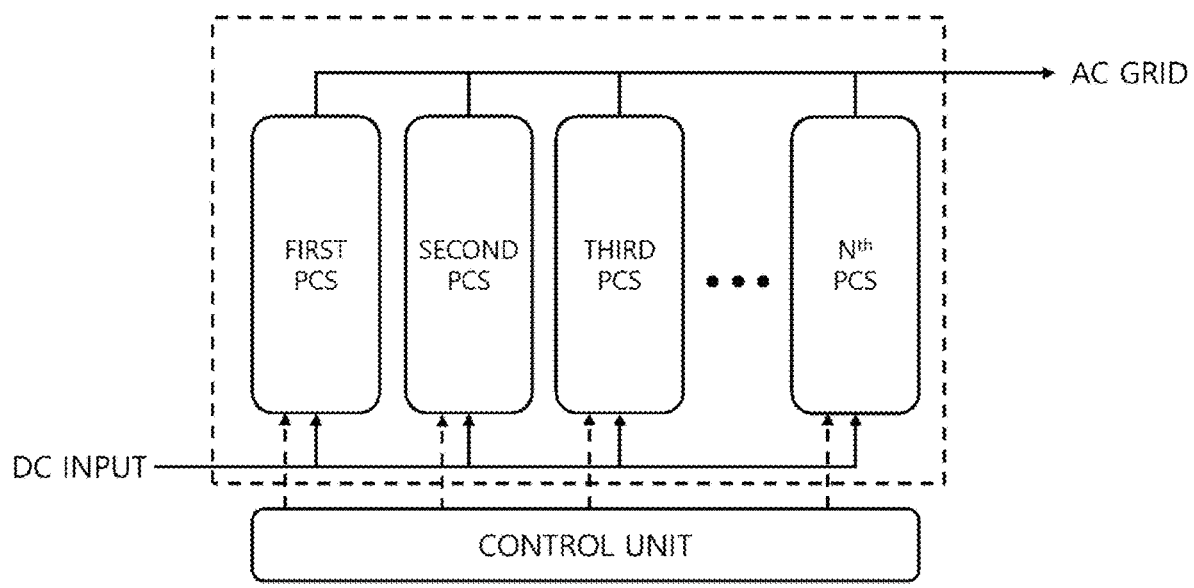
FIG. 6 is a block diagram illustrating an output distribution apparatus of a power supplying system according to one embodiment of the present invention.

FIG. 1 is a flowchart illustrating an output distribution method of a power supplying system according to one embodiment of the present invention, and FIGS. 2 to 5 are detailed drawings and graphs for describing FIG. 1 in detail. In addition, FIG. 6 is a block diagram illustrating an output distribution apparatus of a power supplying system according to one embodiment of the present invention.

Hereinafter, the output distribution method of a power supplying system according to one embodiment of the present invention will be described with reference to FIGS. 1 to 5.

First, referring to FIG. 1, the output distribution method of a power supplying system according to one embodiment of the present invention includes comparing, by a control unit 120, required output power of a power supplying system with a reference value (S110), equally allocating the required output power to all power conditioning systems (PCSs) and operating the PCSs in a first mode when the required output power exceeds the reference value (S120), assigning one or more maximum power-operated PCSs to be operated with maximum operation ratio power based on a maximum operation ratio 131 and a minimum operation ratio 132 when the required output power does not exceed the reference value (S130), comparing residual power, which is not allocated in maximum power-operated PCS power allocating operation S130, with minimum operation ratio power (S140), assigning a residual power-operated PCS to be operated with the residual power and operating the residual power-operated PCS in a second mode together with the one or more maximum power-operated PCSs when the residual power, which is not allocated in maximum power-operated PCS power allocating operation S130, exceeds the minimum operation ratio power (S150), comparing the residual power, which is not allocated in maximum power-operated PCS power allocating operation S130, with the minimum operation ratio power (S140), and equally dividing and reallocating the required output power to the maximum power-operated PCSs assigned in maximum power-operated PCS power allocating operation S130 and operating the maximum power-operated PCSs in a third mode when the residual power, which is not allocated in maximum power-operated PCS power allocating operation S130, does not exceed the minimum operation ratio power (S160).

Here, the reference value may be set by maximum power of a power supplying system maximum operation ratio.

In addition, the maximum operation ratio power may be set by available maximum power per PCS×maximum operation ratio.

In addition, the minimum operation ratio power may be set by available maximum power per PCS×minimum operation ratio.

In addition, the maximum operation ratio 131 and the minimum operation ratio 132 may be set based on a predicted power generation value of a power supplying system, a power market trend, and a reference set value.

In a power supplying system of the present invention, by using the maximum operation ratio 131 and the minimum operation ratio 132 set based on the predicted power generation value of the power supplying system, the power market trend, and the reference set value, outputs are distributed to the plurality of PCSs in manners of the first mode, the second mode, and the third mode as described above, thereby allowing the power supplying system to achieve an energy conversion efficiency of 98% or more.

For example, in setting the maximum operation ratio 131 and the minimum operation ratio 132, when required output power is low due to a low amount of sunlight resulting from plant characteristics of a site in which the power supplying system is positioned, the maximum operation ratio 131 and the minimum operation ratio 132 are set to relatively low values. Thus, even when output power, at which the overall power conversion efficiency of a system is slightly lowered, is required, conversion efficiency can be increased through a mode operation and a lifetime of a PCS and a PEBB can be increased.

On the other hand, when required output power is high due to a high amount of sunlight resulting from plant characteristics of a site in which the power supplying system is positioned, the maximum operation ratio 131 and the minimum operation ratio 132 are set relatively slightly high. Thus, all PCSs are allowed to participate in power conversion in an area in which power conversion efficiency is high, thereby increasing the power conversion efficiency of the power supplying system and increasing a lifetime of the power supplying system.

Figure 2:
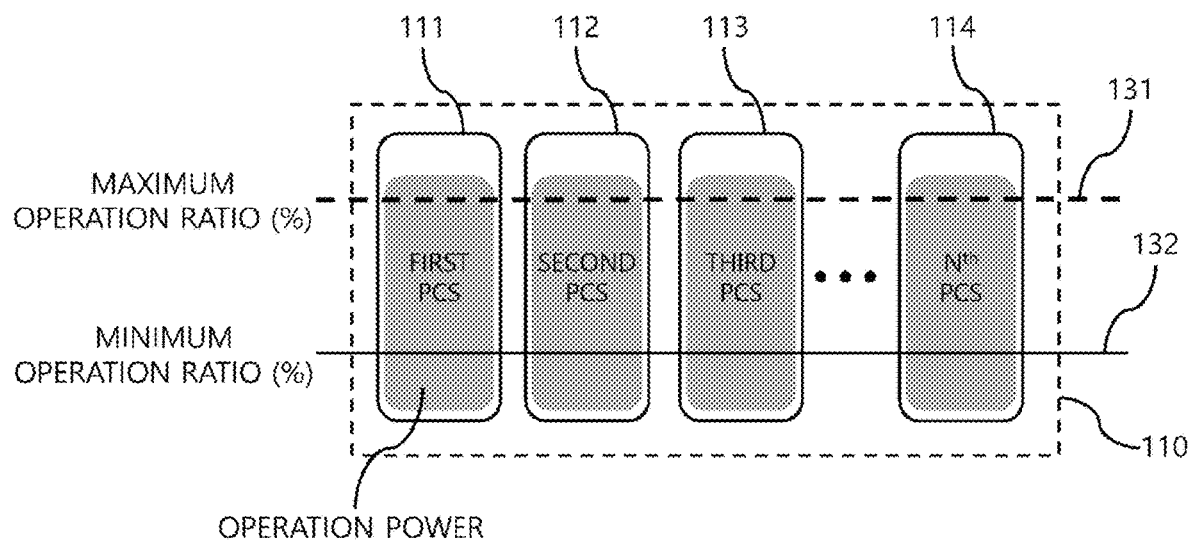
FIG. 2 is a diagram illustrating a detailed operation of the power supplying system of FIG. 1 when the power supplying system operates in a first mode.

FIG. 2 is a diagram illustrating a detailed operation of the power supplying system of FIG. 1 when the power supplying system operates in a first mode.

As can be seen in FIG. 2, in the first mode, when a maximum operation ratio is exceeded in all PCSs, power is allocated to all of a first PCS 111, a second PCS 112, a third PCS 113, and an $N^{th}$ PCS 114, thereby increasing system efficiency.

That is, the first mode has an advantage in that overall system efficiency can be increased by operating all PCSs in an area or time zone in which high output power is required.

Figure 3:
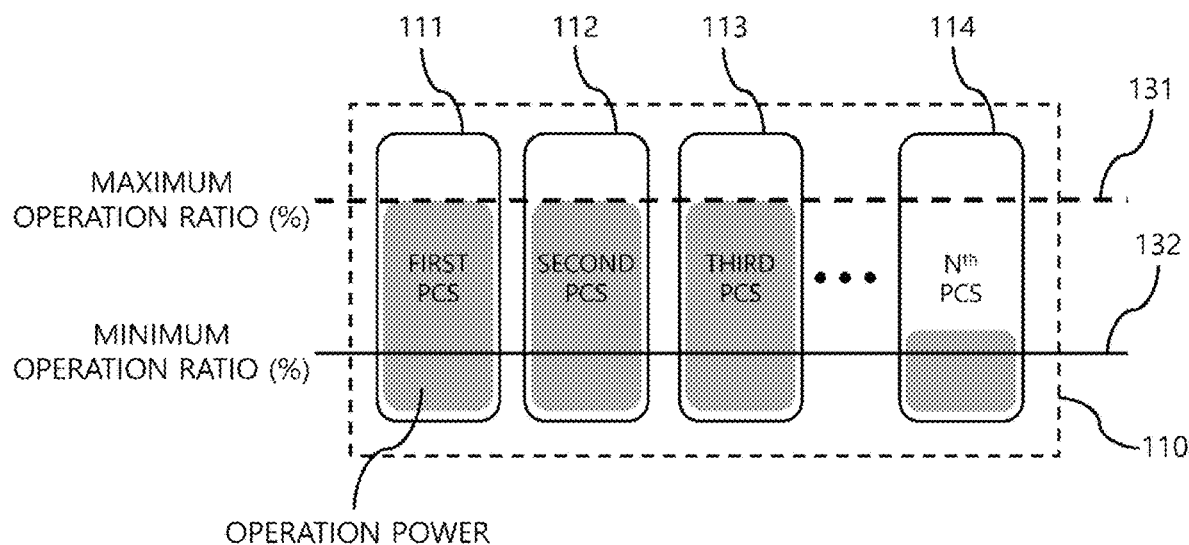
FIG. 3 is a diagram illustrating a detailed operation of the power supplying system of FIG. 1 when the power supplying system operates in a second mode.

FIG. 3 is a diagram illustrating a detailed operation of the power supplying system of FIG. 1 when the power supplying system operates in a second mode.

As can be seen in FIG. 3, in the second mode, the first PCS 111, the second PCS 112, and the third PCS 113 are operated at a maximum operation ratio 131, and residual power is allocated to the $N^{th}$ PCS 114 to operate the $N^{th}$ PCS 114 between a minimum operation ratio 132 and the maximum operation ratio 131.

That is, in the second mode, since additional power is not allocated to the first PCS 111, the second PCS 112, and the third PCS 113 which are operated at the maximum operation ratio 131, conversion efficiency can be increased, and also, overload can be prevented. Thus, overall system efficiency can be increased, and a lifetime of the PCS can be extended.

Figure 4:
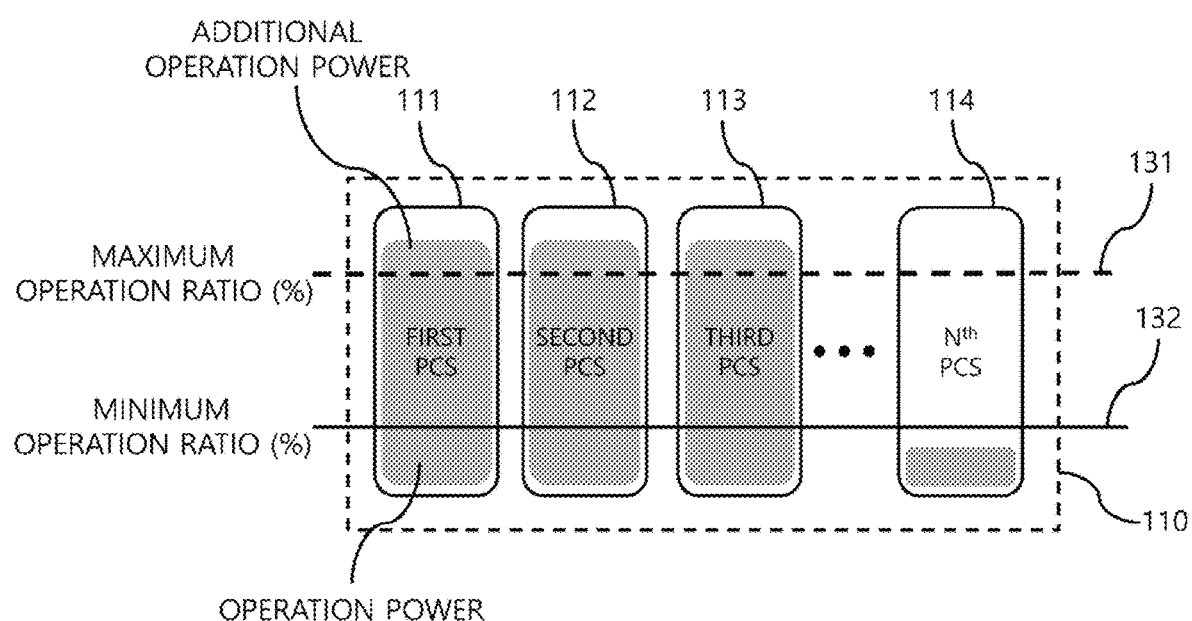
FIG. 4 is a diagram illustrating a detailed operation of the power supplying system of FIG. 1 when the power supplying system operates in a third mode.
Figure 5:
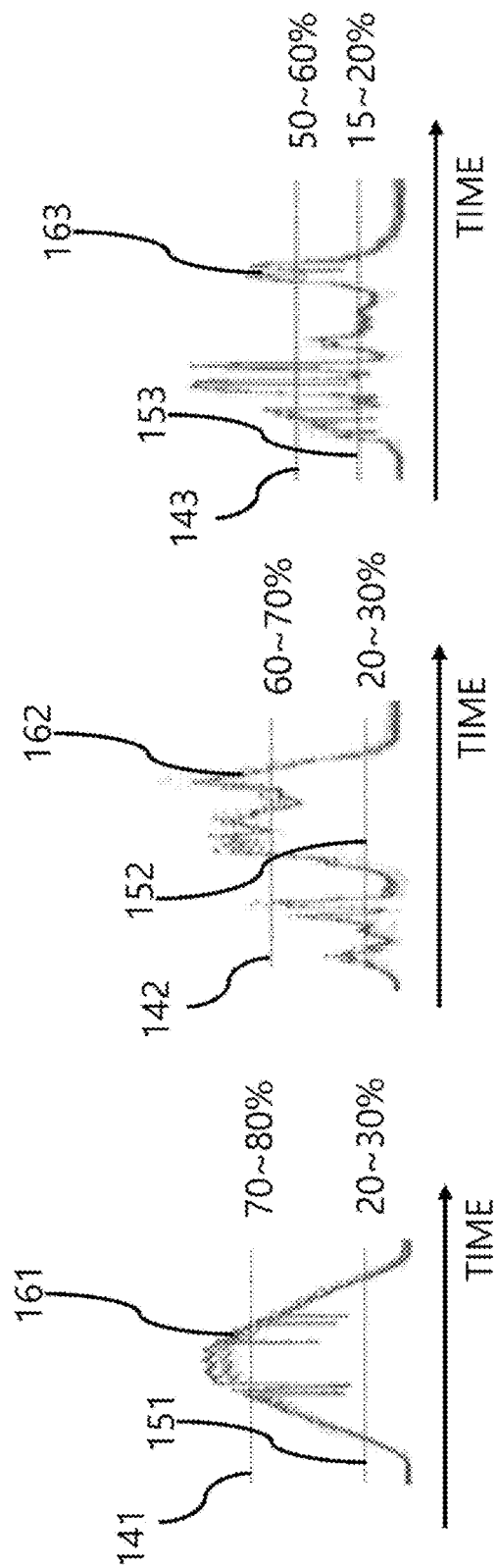
FIGS. 5A-5C show graphs showing a case in which the power supplying system of FIG. 1 operates in a combination of a first mode, a second mode, and a third mode.

FIG. 4 is a diagram illustrating a detailed operation of the power supplying system of FIG. 1 when the power supplying system operates in a third mode.

As can be seen in FIG. 4, in the third mode, without using the $N^{th}$ PCS 114 which should be operated at the minimum operation ratio 132 or lower, residual power is additionally divided and allocated to the first PCS 111, the second PCS 112, and the third PCS 113 which are operated at the maximum operation ratio 131.

That is, in the third mode, since the $N^{th}$ PCS 114 with low conversion efficiency, which is operated at the minimum operation ratio 132 or less, is not used, overall system efficiency can be increased, and the number of times the $N^{th}$ PCS 114 is used can be reduced to extend a lifetime of the $N^{th}$ PCS 114.

The third mode has an advantage in that overall system efficiency can be increased by cancelling an operation of a PCS with low efficiency in an area or time zone in which low output power is required.

FIGS. 5A-5C show graphs showing a case in which the power supplying system of FIG. 1 operates in a combination of a first mode, a second mode, and a third mode.

As can be seen in FIGS. 5A-5C, the control unit 120 may use the first mode when a requested output is greater than or equal to an upper limit reference value, may use any one of the first mode and the second mode when the requested output is less than or equal to the upper limit reference value and greater than or equal to a lower limit reference value, and may use any one of the second mode and the third mode when the requested output is less than or equal to the lower limit reference value.

Here, FIG. 5A is a graph showing a case in which an amount of sunlight is very high and output power 161 of the power supplying system is greater than the upper limit reference value, FIG. 5B is a graph showing a case in which an amount of sunlight is medium and output power 162 of the power supplying system is less than or equal to the upper limit reference value and greater than or equal to the lower limit reference value, and FIG. 5C is a graph showing a case in which an amount of sunlight is low and output power 163 of the power supplying system is less than or equal to the lower limit reference value.

That is, in the power supplying system of the present invention, as shown in FIG. 5A, when the output power 161 of the power supplying system is greater than or equal to the upper limit reference value, a first maximum operation ratio 141 and a first minimum operation ratio 151 are set to be high to operate all PCSs, thereby increasing power efficiency, as shown in FIG. 5B, when the output power 162 of the power supplying system is between the upper limit reference value and the lower limit reference value, a second maximum operation ratio 142 and a second minimum operation ratio 152 are set to be slightly low to operate PCSs in the first mode and the second mode so as to first use PCSs with slight high power conversion efficiency, thereby increasing power efficiency, and as shown in FIG. 5C, when the output power 163 of the power supplying system is less than or equal to the lower limit reference value, a third maximum operation ratio 143 and the third minimum operation ratio 153 are set to be low to operate PCSs in the second mode and the third mode so as to determine whether PCSs with low conversion efficiency participate, thereby increasing the efficiency of the power supplying system and increasing a lifetime thereof.

Here, the upper limit reference value and the lower limit reference value are reference values capable of determining an operation mode of the power supplying system according to a required output of the power supplying system designed based on a predicted power generation value of the power supplying system, a power market trend, and a reference set value.

For example, when the predicted power generation value of the power supplying system is high and a power market price is low, power at which all PCSs can participate in an area with high conversion efficiency is set to the upper limit reference value. When the predicted power generation value of the power supplying system is low and the power market price is high, although conversion efficiency is low in the power supplying system, power at which all PCSs can participate is set to the lower limit reference value.

Meanwhile, when an operation mode is determined according to the upper limit reference value and the lower limit reference value, a maximum operation ratio and a minimum operation ratio may be determined according to the operation mode.

For example, the first mode may correspond to a case in which the predicted power generation value of the power supplying system is high and the power market price is low. In this case, the first maximum operation ratio 141 and the first minimum operation ratio 151 are set to be high to allow only PCSs with high conversion efficiency to participate in power conversion. In addition, the second mode may correspond to a case in which the predicted power generation value of the power supplying system is high and the power market price is high, or a case in which the predicted power generation value of the power supplying system is low and the power market price is low. In this case, the second maximum operation ratio 142 and the second minimum operation ratio 152 are set to be slightly low. The third mode may correspond to a case in which the predicted power generation value of the power supplying system is low and the price of the power market is high. In this case, the third maximum operation ratio 143 and the third minimum operation ratio 153 are set to be low, and thus, although conversion efficiency is low, PCSs are allowed to participate in power conversion.

FIG. 6 is a block diagram illustrating an output distribution apparatus of a power supplying system according to one embodiment of the present invention.

As can be seen in FIG. 6, the output distribution apparatus of a power supplying system includes first to $N^{th}$ PCSs which convert direct current (DC) input power into alternating current (AC) power and supply the AC power to a grid and a control unit 120 which divides required output power to be supplied to the grid into maximum operation ratio power and residual power based on a maximum operation ratio 131 and a minimum operation ratio 132 and selects maximum power-operated PCSs and residual power-operated PCSs from among the first to $N^{th}$ PCSs to allocate the maximum operation ratio power and the residual power thereto.

Here, the maximum operation ratio power may be calculated by available maximum power per PCS×maximum operation ratio.

Here, a minimum operation ratio power is available maximum power per PCS×minimum operation ratio.

In addition, the maximum operation ratio 131 and the minimum operation ratio 132 may be set based on a predicted power generation value of a power supplying system, a power market trend, and a reference set value.

In the output distribution apparatus of a power supplying system according to one embodiment of the present invention, a control unit 120 compares required output power with respect to a DC input of the power supplying system with a reference value, when the required output power exceeds the reference value, equally allocates the required output power to all the PCSs, and when the required output power does not exceed the reference value, selects PCSs to be operated with the maximum operation ratio power and PCSs to be operated with the residual power to allocate the maximum operation ratio power and the residual power thereto.

In this case, when the residual power exceeds the minimum operation ratio power, the control unit 120 allocates residual power not allocated to maximum power operated-PCSs to residual power-operated PCSs, and when the residual power does not exceed the minimum operation ratio power, the control unit 120 equally allocates the residual power to the maximum power-operated PCSs.

As described above, in the output distribution apparatus of a power supplying system according to one embodiment of the present invention, by using the maximum operation ratio 131 and the minimum operation ratio 132 set based on the predicted power generation value of the power supplying system, the power market trend, and the reference set value, outputs are distributed to the plurality of PCSs, thereby increasing the energy conversion efficiency of the power supplying system and controlling the operation of the PCSs in the power supplying system to increase a lifetime of the PCSs.

Meanwhile, since a detailed method of distributing the outputs to the plurality of PCSs based on the maximum operation ratio 131 and the minimum operation ratio 132 has been described above, a description thereof will be omitted.

Figure 7:
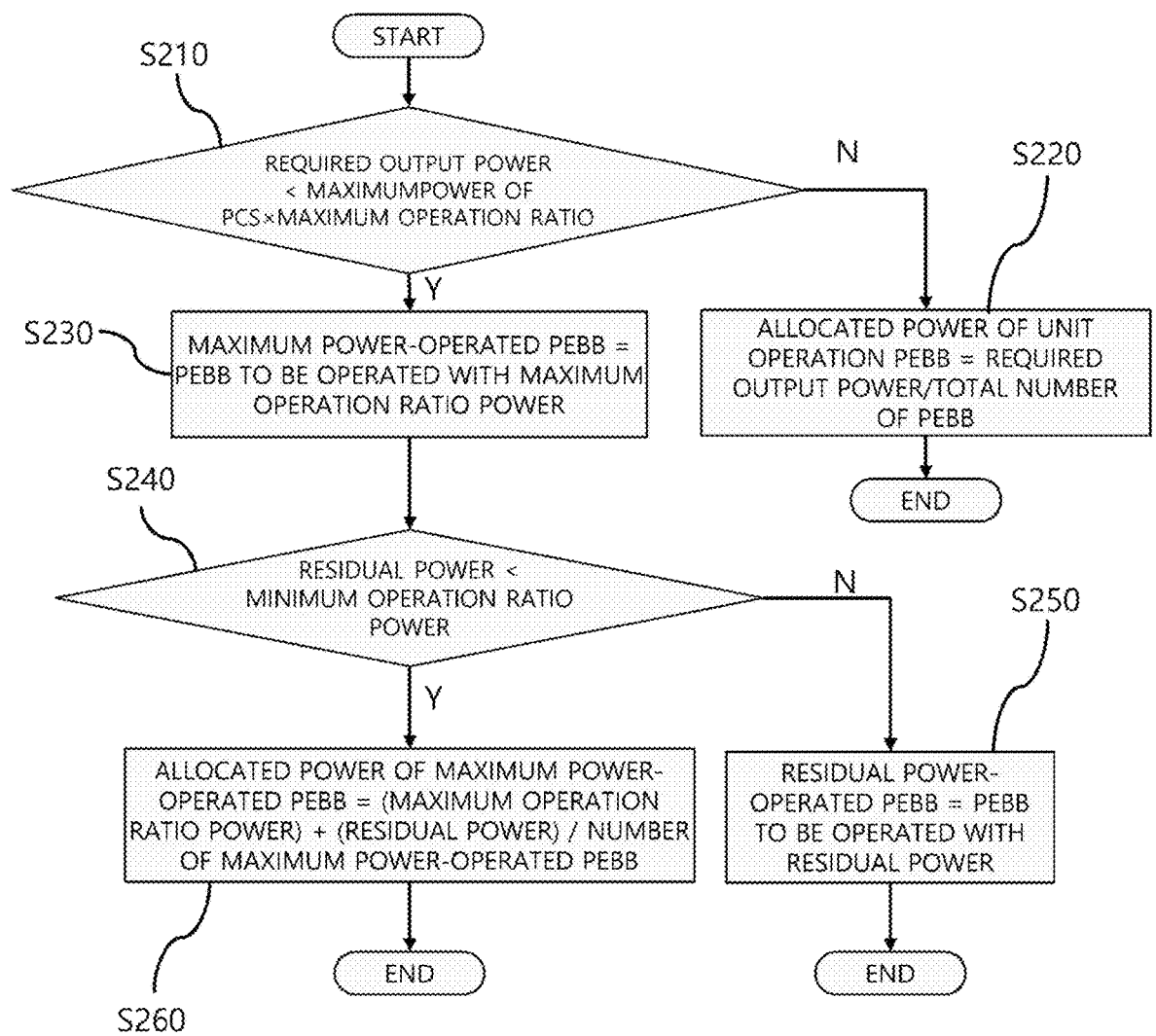
FIG. 7 is a flowchart illustrating an output distribution method of a power supplying system according to another embodiment of the present invention.

FIG. 7 is a flowchart illustrating an output distribution method of a power supplying system according to another embodiment of the present invention.

Hereinafter, in another embodiment, a configuration is assumed in which a power supplying system includes one PCS, and the corresponding PCS includes a plurality of power electronics building blocks (PEBBs, hereinafter referred to as "PEBBs").

Hereinafter, the output distribution method of a power supplying system according to another embodiment of the present invention will be described with reference to FIG. 7.

Referring to FIG. 7, the output distribution method of a power supplying system according to another embodiment of the present invention includes comparing required output power of a PCS 210 with a reference value (S210), equally allocating the required output power to all the PEBBs and operating the PEBBs in a first mode when the required output power exceeds the reference value (S220), assigning one or more maximum power-operated PEBBs to be operated with maximum operation ratio power based on a maximum operation ratio 231 and a minimum operation ratio 232 when the required output power does not exceed the reference value (S230), comparing residual power, which is not allocated in maximum power-operated PEBB power allocating operation S230, with minimum operation ratio power (S140), assigning a residual power-operated PEBB to be operated with the residual power and operating the residual power-operated PCS in a second mode together with the one or more maximum power-operated PEBBs when the residual power, which is not allocated in maximum power-operated PEBB power allocating operation S230, exceeds the minimum operation ratio power (S250), comparing the residual power, which is not allocated in maximum power-operated PEBB power allocating operation S230, with the minimum operation ratio power (S240), and equally dividing and reallocating the required output power to the maximum power-operated PEBBs assigned in the maximum power-operated PEBB power allocating operation and operating the maximum power-operated PEBBs in a third mode when the residual power, which is not allocated in maximum power-operated PEBB power allocating operation S230, does not exceed the minimum operation ratio power (S260).

Here, the reference value may be set by maximum power of the PCS 210×maximum operation ratio.

In addition, the maximum operation ratio power may be set by available maximum power per PEBB×maximum operation ratio.

Here, the minimum operation ratio power may be set by available maximum power per PEBB×minimum operation ratio.

In addition, the maximum operation ratio 131 and the minimum operation ratio 132 may be set based on a predicted power generation value of the PCS 210, a power market trend, and a reference set value.

That is, in the output distribution method of a power supplying system according to another embodiment of the present invention, by using the maximum operation ratio 231 and the minimum operation ratio 232 set based on the predicted power generation value of the PCS 210, the power market trend, and the reference set value, outputs are distributed to the plurality of PEBBs in manners of the first mode, the second mode, and the third mode as described above, thereby improving the energy conversion efficiency of a power supplying system.

For example, in setting the maximum operation ratio 131 and the minimum operation ratio 132, when required output power is low due to a low amount of sunlight resulting from plant characteristics of a site in which the PCS 210 is positioned, the maximum operation ratio 131 and the minimum operation ratio 132 are set to relatively low values. Thus, even when power conversion efficiency is slightly lowered, all PEBBs can be operated.

On the other hand, when required output power is high due to a high amount of sunlight resulting from plant characteristics of a site in which the PCS is positioned, the maximum operation ratio 131 and the minimum operation ratio 132 are set to be relatively slightly high. Thus, all PEBBs are allowed to participate in power conversion in an area in which power conversion efficiency is high, thereby increasing the power conversion efficiency of the PCS 210 and increasing a lifetime of the PCS 210.

Meanwhile, since a specific operation method of the PEBB in each mode is the same as the above-described output distribution method for the plurality of PCS except that the specific operation method is applied to the plurality of PEBBs, a detailed description thereof will be omitted.

As described above, in an output distribution method and apparatus of a power supplying system according to the present invention, a power supplying system is operated according to the plant characteristics and operating environment of a site in which the power supplying system is positioned, thereby improving overall system efficiency and increasing a lifetime of a PCS.

What has been described above includes examples of one or more embodiments. Of course, it is not possible to describe all possible combinations of components or methods for the purpose of describing the above-described embodiments but it can be perceived that those skilled in the art may make many additions and replacements of various embodiments. Accordingly, the described embodiments include all alternatives, modifications, and changes without departing from the spirit and scope of the present invention as defined in the following claims.

INDUSTRIAL AVAILABILITY

The present invention relates to an output distribution of a power supplying system and is available in a field of power.

The invention claimed is:

1. An output distribution method of a power supplying system which includes a plurality of power conditioning systems (PCSs), the output distribution method comprising:
 a required output power comparing operation of comparing required output power of a power supplying system with a reference value;

a unit operation PCS power allocating operation of, when the required output power exceeds the reference value, equally allocating the required output power to the plurality of PCSs and operating the plurality of PCSs in a first mode;

a maximum power-operated PCS power allocating operation of, when the required output power does not exceed the reference value, assigning one or more maximum power-operated PCSs to be operated with maximum operation ratio power based on a maximum operation ratio and a minimum operation ratio;

a residual power-operated PCS power allocating operation of, when residual power, which is not allocated in the maximum power-operated PCS power allocating operation, exceeds minimum operation ratio power, assigning a residual power-operated PCS to be operated with the residual power and operating the residual power-operated PCS in a second mode together with the one or more maximum power-operated PCSs; and a maximum power-operated PCS power reallocating operation of, when the residual power, which is not allocated in the maximum power-operated PCS power allocating operation, does not exceed the minimum operation ratio power, equally dividing and reallocating the required output power to the maximum power-operated PCSs assigned in the maximum power-operated PCS power allocating operation and operating the maximum power-operated PCSs in a third mode, wherein the maximum operation ratio and the minimum operation ratio are set based on a predicted power generation value of the power supplying system, a power market trend, and a reference set value, and wherein the power market trend is a power market price.

2. The output distribution method of claim 1, wherein the reference value is maximum power of the power supplying system×the maximum operation ratio.

3. The output distribution method of claim 1, wherein the maximum operation ratio power is available maximum power per PCS×the maximum operation ratio.

4. The output distribution method of claim 1, wherein the minimum operation ratio power is available maximum power per PCS×the minimum operation ratio.

5. The output distribution method of claim 1, wherein:
when the requested output power is greater than or equal to an upper limit reference value, the first mode is used;
when the requested output power is less than or equal to the upper limit reference value and greater than or equal to a lower limit reference value, any one of the first mode and the second mode is used; and
when the requested output power is less than or equal to the lower limit reference value, any one of the second mode and the third mode is used.

6. The output distribution method of claim 5, wherein the upper limit reference value and the lower limit reference value are set based on the predicted power generation value of the power supplying system, the power market trend, and the reference set value.

7. The output distribution method of claim 5, wherein, when an operation mode is determined according to the upper limit reference value and the lower limit reference value, the maximum operation ratio and the minimum operation ratio are determined according to the operation mode.

8. An output distribution method of a power supplying system which includes a power conditioning system (PCS) including a plurality of power electronics building blocks (PEBBs), the output distribution method comprising:

a required output power comparing operation of comparing required output power of a PCS with a reference value;

a unit operation PEBB power allocating operation of, when the required output power exceeds the reference value, equally allocating the required output power to all PEBBs and operating the PEBBs in a first mode;

a maximum power-operated PEBB power allocating operation of, when the required output power does not exceed the reference value, assigning one or more maximum power-operated PEBBs to be operated with maximum operation ratio power based on a maximum operation ratio and a minimum operation ratio;

a residual power-operated PEBB power allocating operation of, when residual power, which is not allocated in the maximum power-operated PEBB power allocating operation, exceeds minimum operation ratio power, assigning a residual power-operated PEBB to be operated with the residual power and operating the residual power-operated PCS in a second mode together with the one or more maximum power-operated PEBBs; and a maximum power-operated PEBB power reallocating operation of, when the residual power, which is not allocated in the maximum power-operated PEBB power allocating operation, does not exceed the minimum operation ratio power, equally dividing and reallocating the required output power to the maximum power-operated PEBBs assigned in the maximum power-operated PEBB power allocating operation and operating the maximum power-operated PEBBs in a third mode, wherein the maximum operation ratio and the minimum operation ratio are set based on a predicted power generation value of the PCS, a power market trend, and a reference set value, and wherein the power market trend is a power market price.

9. The output distribution method of claim 8, wherein the reference value is maximum power of the PCS×the maximum operation ratio.

10. The output distribution method of claim 8, wherein the maximum operation ratio power is available maximum power per PEBB×the maximum operation ratio.

11. The output distribution method of claim 8, wherein the minimum operation ratio power is available maximum power per PEBB×the minimum operation ratio.

12. The output distribution method of claim 8, wherein:
when the requested output power is greater than or equal to an upper limit reference value, the first mode is used;
when the requested output power is less than or equal to the upper limit reference value and greater than or equal to a lower limit reference value, any one of the first mode and the second mode is used; and
when the requested output power is less than or equal to the lower limit reference value, any one of the second mode and the third mode is used.

13. The output distribution method of claim 12, wherein the upper limit reference value and the lower limit reference value are set based on the predicted power generation value of the PCS, the power market trend, and the reference set value.

14. The output distribution method of claim 12, wherein, when an operation mode is determined according to the upper limit reference value and the lower limit reference value, the maximum operation ratio and the minimum operation ratio are determined according to the operation mode.

* * * * *